US012565897B1

(12) United States Patent
Vaddiraju et al.

(10) Patent No.: US 12,565,897 B1
(45) Date of Patent: Mar. 3, 2026

(54) FAN OPTIMIZATION BASED ON AMBIENT AND RADIATOR OUTLET TEMPERATURES

(71) Applicant: Zoox, Inc., Foster City, CA (US)

(72) Inventors: Srinivasa Rao Vaddiraju, Fremont, CA (US); Qinling Zheng, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 272 days.

(21) Appl. No.: 18/374,567

(22) Filed: Sep. 28, 2023

Related U.S. Application Data

(60) Provisional application No. 63/411,366, filed on Sep. 29, 2022.

(51) Int. Cl.
    F04D 27/00      (2006.01)
    B60K 11/04      (2006.01)
(52) U.S. Cl.
    CPC ............ F04D 27/004 (2013.01); B60K 11/04 (2013.01)
(58) Field of Classification Search
    CPC ...................... B60H 1/00457; B60H 1/00828
    See application file for complete search history.

(56) References Cited

U.S. PATENT DOCUMENTS

| | | | |
|---|---|---|---|
| 6,332,330 B1 | 12/2001 | Loup et al. | |
| 6,743,539 B2 * | 6/2004 | Clingerman ...... | H01M 8/04358 123/41.12 |
| 7,451,608 B2 | 11/2008 | Kikuchi | |
| 7,988,543 B2 | 8/2011 | Major | |

| | | |
|---|---|---|
| 9,517,678 B2 | 12/2016 | Matsuda et al. |
| 9,914,336 B2 | 3/2018 | Smith |
| 10,668,926 B2 | 6/2020 | Birnschein et al. |
| 10,737,737 B2 | 8/2020 | Birnschein et al. |
| 10,843,550 B2 | 11/2020 | Wong |
| 10,985,391 B2 | 4/2021 | Farnsworth et al. |

(Continued)

FOREIGN PATENT DOCUMENTS

| | | |
|---|---|---|
| DE | 102011077339 | 12/2011 |
| DE | 102016112089 | 1/2018 |

(Continued)

OTHER PUBLICATIONS

Sawant, et al., U.S. Appl. No. 18/087,014, filed Dec. 22, 2022, Titled "Cooling System Assembly for Bidirectional Vehicle", 55 pages.

*Primary Examiner* — Huan Le
(74) *Attorney, Agent, or Firm* — Lee & Hayes, P.C.

(57)      ABSTRACT

Techniques for cooling a portion of a vehicle are discussed herein. A thermal management component may receive an ambient temperature proximate the vehicle. The vehicle may also receive a first coolant outlet temperature from a first radiator and a second coolant outlet temperature from a second radiator. In some examples, the first radiator may be located at a first end of the vehicle while the second radiator can be located at a second (and opposite) end of the vehicle. The thermal management component may determine a first cooling parameter for a first radiator fan proximate the first radiator and a second cooling parameter for a second radiator fan proximate the second radiator. Upon determining the first and/or second cooling parameter(s), the thermal management component may operate the first fan according to the first cooling parameter and the second fan according to the second cooling parameter.

20 Claims, 6 Drawing Sheets

(56) References Cited

U.S. PATENT DOCUMENTS

| 11,094,950 | B2 | 8/2021 | Folick et al. | |
| 11,104,394 | B2 | 8/2021 | Birnschein et al. | |
| 11,279,206 | B1 | 3/2022 | Mueller et al. | |
| 11,407,462 | B2 | 8/2022 | Birnschein et al. | |
| 11,551,660 | B1 | 1/2023 | Baker et al. | |
| 11,612,084 | B1 | 3/2023 | Swatko | |
| 11,659,696 | B2 | 5/2023 | McEathron et al. | |
| 11,673,448 | B2 | 6/2023 | Cohan et al. | |
| 11,685,456 | B2 | 6/2023 | Birnschein et al. | |
| 11,745,612 | B1 | 9/2023 | Ocampo Villegas et al. | |
| 11,884,127 | B2 | 1/2024 | Jeong et al. | |
| 2013/0239913 | A1* | 9/2013 | Young | F01P 3/18 |
| | | | | 123/41.49 |

FOREIGN PATENT DOCUMENTS

| DE | 102020210454 | 5/2021 |
| EP | 4292912 | 12/2023 |
| GB | 2606678 | 11/2022 |
| KR | 20230088316 | 6/2023 |

* cited by examiner

600 ⬂

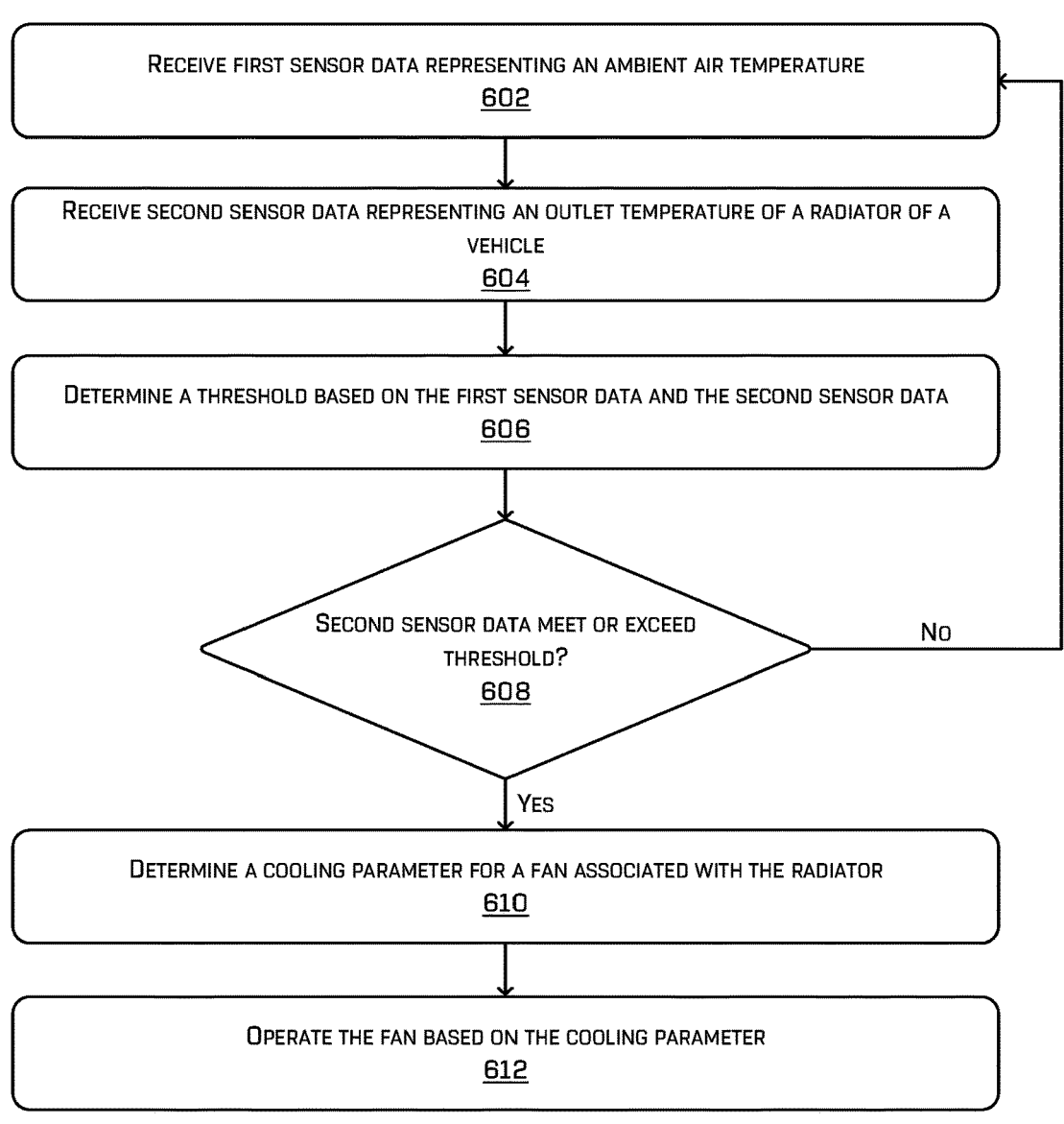

RECEIVE FIRST SENSOR DATA REPRESENTING AN AMBIENT AIR TEMPERATURE
602

RECEIVE SECOND SENSOR DATA REPRESENTING AN OUTLET TEMPERATURE OF A RADIATOR OF A VEHICLE
604

DETERMINE A THRESHOLD BASED ON THE FIRST SENSOR DATA AND THE SECOND SENSOR DATA
606

SECOND SENSOR DATA MEET OR EXCEED THRESHOLD?
608

NO

YES

DETERMINE A COOLING PARAMETER FOR A FAN ASSOCIATED WITH THE RADIATOR
610

OPERATE THE FAN BASED ON THE COOLING PARAMETER
612

FIG. 6

FAN OPTIMIZATION BASED ON AMBIENT AND RADIATOR OUTLET TEMPERATURES

PRIORITY

This application claims the benefit of, and priority to U.S. Provisional Application No. 63/411,366, filed Sep. 29, 2022, both of which are incorporated herein by reference in their entirety and for all purposes.

BACKGROUND

Thermal control is important in vehicle operation. Various parts such as motors, batteries, pumps, computers, etc., generate heat when the vehicle is in motion or even in charging. Heat that is generated in the vehicle can be rejected to the ambient environment via a radiator and/or condenser with the help of radiator fans. There is an association between the radiator fan speed, aerodynamic forces generated due to the air flowing through the radiator into the under-hood area (which may be speed dependent) and/or energy spent to run the compressor. This interaction can also be dependent on the ambient temperature. An optimized fan speed based on ambient temperature and radiator outlet coolant temperature can minimize the overall energy spent while still sufficiently rejecting waste heat into the ambient environment. Moreover, when a bi-directional vehicle travels in one direction, the leading end of the vehicle (i.e., the end oriented in a direction of travel) may receive higher airflow than the trailing end of the vehicle (i.e., the end opposite the direction of travel). The optimal airflow levels needed for leading and trailing side radiators can be different. a controls schema for the fans can account for these differences in performance between radiators depending on the direction of travel, energy needs of components on the vehicle, and/or cooling requirements of components. The invention disclosed in this application can determine radiator fan speed based on ambient temperature and radiator outlet temperature and minimize overall energy usage by a vehicle using the disclosed techniques.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 6 is a flow diagram illustrating an example process of determining ambient and radiator coolant outlet temperatures, determining a cooling parameter based on such temperatures, and operating a fan based on the cooling parameter.

DETAILED DESCRIPTION

Figure 1:
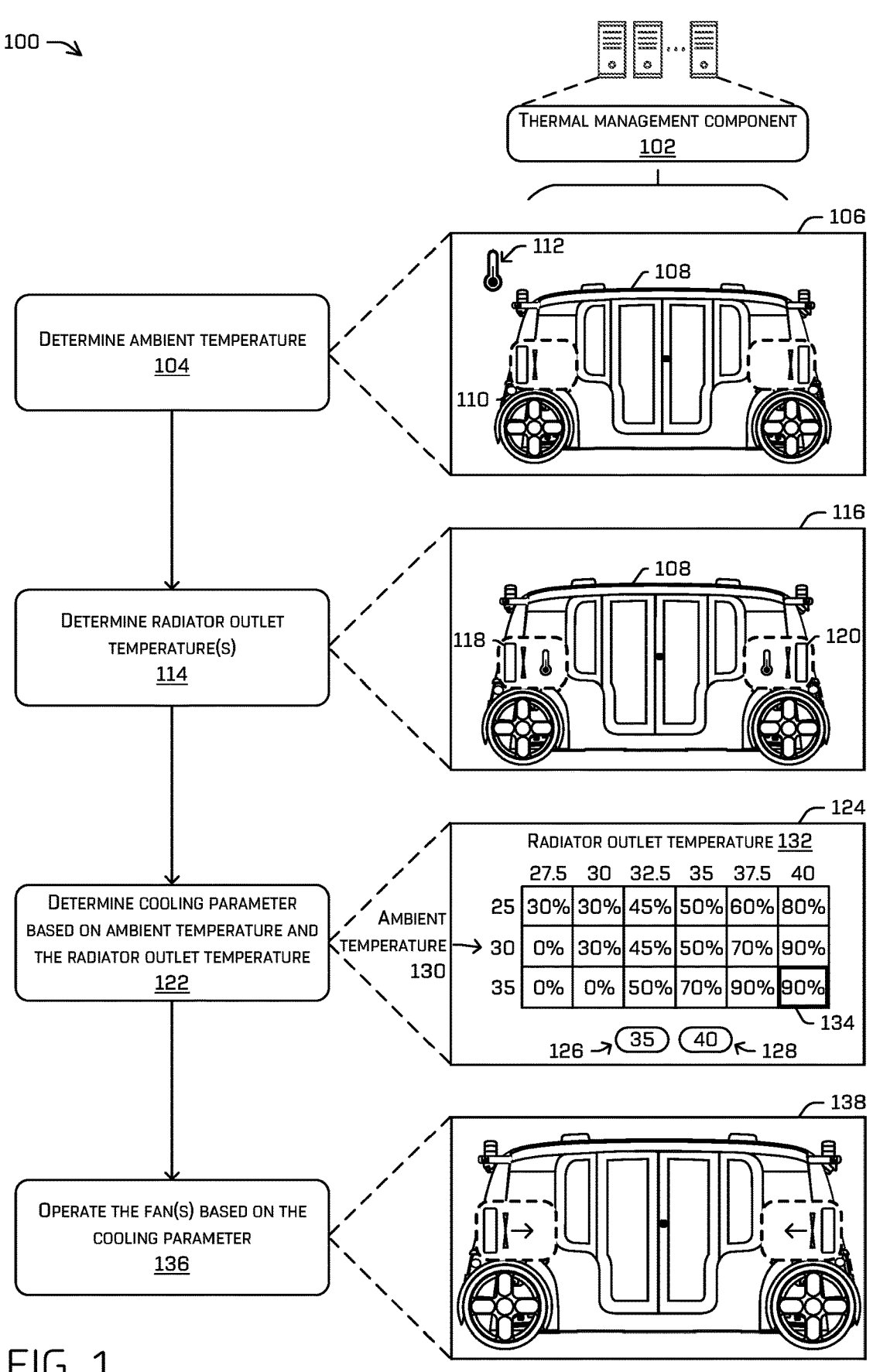
FIG. 1 is a pictorial flow diagram illustrating an example technique for determining an ambient temperature, determining a radiator coolant outlet temperature, determining a cooling parameter based on the ambient and radiator outlet temperatures, and operating a fan based on the cooling parameter, in accordance with one or more examples of the disclosure.

As discussed above, techniques for cooling vehicle components can result in excessive energy consumption and/or heat load. Vehicle components that consume excessive amounts of energy can unduly deplete a vehicle's power reserve (which may be especially true for electric vehicles). Higher energy usage may result in a shortened driving range, and/or failure to adequately maintain a desired temperature in the passenger compartment or at certain components of a vehicle (such as a computer system that may be used for autonomous driving actions).

Techniques for minimizing energy consumption associated with cooling a portion of a vehicle are discussed herein. For instance, ambient temperature and/or radiator coolant outlet temperatures may be evaluated to determine an optimal cooling parameter (e.g., fan duty cycle, fan speed, etc.) to minimize vehicle energy consumption. In some examples, a thermal management component may receive or otherwise determine an ambient air temperature proximate the vehicle. The vehicle may also receive or otherwise determine a first coolant outlet temperature from a first radiator and a second coolant outlet temperature from a second radiator. In some examples, the first radiator may be located (e.g., installed) at a first end of the vehicle (first longitudinal end) while the second radiator can be located at a second (and opposite) end of the vehicle (second longitudinal end). The thermal management component may determine a first cooling parameter (e.g., duty cycle) for a first radiator fan (e.g., a fan) proximate the first radiator and a second cooling parameter for a second radiator fan proximate the second radiator. Upon determining the first and/or second cooling parameter(s), the thermal management component may operate (e.g., control) the first fan according to the first cooling parameter and the second fan according to the second cooling parameter. As described in more detail below, the techniques described herein may improve vehicle safety and driving efficiency by ensuring that the radiator fan(s) operate at an optimal fan cycle, thereby cooling vehicle components such as computing components used to operate vehicle safety systems, while also minimizing energy consumed by the vehicle to operate the cooling system(s). In some examples, the techniques described herein may additionally or alternatively reduce energy for operation of the vehicle by reducing drag on the vehicle (e.g., associated with air passing through/around the cooling system of the vehicle).

Conventional cooling systems that cool battery, motor components and/or a cabin can result in the vehicle experiencing an excessive amount of energy consumption associated with operation of cooling system components and/or drag associated with air passing through/around the cooling system components. For example, a vehicle may include various battery and/or motor components configured to propel the vehicle through an environment. Such components may consume large amounts of energy and/or generate large amounts of heat. Excessive amounts of heat in and around these components can lead to various types of vehicle failures or degradations (e.g., shortened driving range, inability to regulate passenger compartment temperature, damaged components, etc.). For example, an overheating battery can be a safety concern while a processor overheating can result in reduced performance which may also be a safety issue for an autonomous vehicle. As such, conventional cooling systems may include one or more fans proximate the radiator and/or other engine components. The fan(s) may be configured to facilitate the cooling of the radiator coolant by increasing the airflow through the radiator so the radiator can cool the coolant to a lower temperature and/or at a quicker rate. The coolant may be used to cool various other components of the vehicle. However, excessive use of the fans can result in the vehicle consuming more energy than is necessary to cool the components of the vehicle (e.g., drive systems, computing systems, passenger climate control temperatures, etc.). Vehicles experience drag as a force opposite the vehicle's direction of travel due to air resistance as they move through the environment against. Drag may increase when the air flows through and around the fans, radiator, and/or other cooling system components. As such, excessive and/or continuous use of the fans can increase the amount of drag, which may result in the components consuming more energy. Excessive energy consumption for operation of the fans and/or other cooling components may reduce the driving range of the vehicle. For instance, the vehicle may include a battery containing a finite amount of power and as such, use of energy to run the fans and other cooling system components can reduce the amount of energy available to operate the vehicle, thereby reducing the vehicle's operating range and/or time. Consequently, the limitations to conventional cooling techniques may result in excessive energy consumption and/or drag.

To address these and other technical problems and inefficiencies, the systems and/or techniques described herein can include a thermal management system (which also may be referred to as a "thermal management component" or a "thermal manager") configured to manage the cooling of various vehicle components. Further, the thermal management component may leverage various sensor devices to determine an ambient temperature of an environment in which the vehicle operates and/or one or more radiator coolant outlet temperatures, which may be evaluated to determine a cooling parameter (e.g., duty cycle, speed, etc.) for one or more radiator fans. Technical solutions discussed herein solve one or more technical problems associated with conventional cooling systems, thereby reducing or minimizing energy consumption by the cooling system and/or vehicle drive components.

In some examples, the thermal management component may determine an ambient air temperature proximate the vehicle. Ambient air may be air that is external to the vehicle, external to the engine compartment, and/or spaced from heat generating sources of the vehicle (e.g., outdoor air). In some examples, the vehicle may include multiple sensor devices configured to receive sensor data indicative of the ambient air temperature proximate the sensor device. Further, each sensor device may provide unique sensor data representative of the ambient air temperature proximate the sensor device.

In some examples, the thermal management component may determine a coolant outlet temperature of a radiator. The vehicle may include one or more radiators configured to dissipate thermal energy to an environment. In some examples, the vehicle may include radiator(s) on one or both ends (e.g., leading and/or trailing ends) of the vehicle. Each radiator may be independently operable, while in some examples the radiators may be operated in concert.

In some examples, component(s) of the battery and/or motor may experience varying levels of heat based on various factors (e.g., vehicle bi-directionality, a direction of travel, a drag coefficient, a fan speed and/or duty cycle, a temperature, etc.). Accordingly, the radiator may cool the component(s) by cooling (e.g., lowering the temperature) coolant and subsequently sending the coolant or refrigerant to various vehicle components (e.g., drive system component(s), computing component(s), passenger compartment climate control component(s), and/or sensor(s)). In some instances, high ambient air temperature, high thermal output of vehicle components, and/or excessive energy consumption may limit the minimum temperature to which the radiator can cool the coolant. A thermal management component may measure the coolant outlet temperature (e.g., the coldest temperature of the coolant), and when the coolant outlet temperature meets or exceeds a threshold value, the thermal management component may engage a radiator fan to blow air through and/or around the radiator to cool the coolant to a lower temperature, thereby allowing the radiator to sufficiently cool the engine component(s).

Accordingly, the thermal management component may determine a coolant outlet temperature of some or all radiators. One or more of the radiator(s) may include a sensor device configured to receive sensor data representing the radiator coolant outlet temperature. In some examples, the sensor device may be a thermocouple device that is disposed on or otherwise affixed to the radiator or any portion of the coolant line. The thermocouple may be configured to measure the temperature of the coolant at the outlet of the radiator. In some examples, if the vehicle includes a radiator disposed at each end of the vehicle, the thermal management component may determine or otherwise receive, from two separate thermocouple devices, two radiator coolant outlet temperatures. In such instances, the first coolant outlet temperature may correspond to the coolant outlet temperature by the radiator on the leading end while the second coolant outlet temperature represents the coolant outlet temperature of the radiator on the trailing end of the vehicle.

In some examples, the thermal management component may determine a cooling parameter for a radiator fan based on the radiator coolant outlet temperature meeting or exceeding a threshold value. For instance, upon determining the ambient and radiator outlet temperatures, the thermal management component may determine whether the radiator outlet temperature meets or exceeds a threshold temperature. Upon determining that the radiator outlet temperature meets or exceeds the threshold value, and to ensure adequate cooling of the vehicle components while minimizing drag and/or fan speed (and thus energy consumption), the thermal management component may determine fan engagement levels based on such temperature values.

In some examples, the thermal management component may determine a cooling parameter for a fan based on the ambient and radiator outlet temperatures. A cooling parameter may include a duty cycle (e.g., the percentage of time the fan is operating) of the fan and/or a speed of the fan which may be controlled by, for example, adjusting current applied to the fan. In such instances, the cooling parameter may indicate that the fan is to operate at a speed and/or duty cycle less than or equal to the maximum speed or duty cycle of the fan. In some examples, the thermal management component may include a database that contains a specific cooling parameter for the fan based on particular ambient and radiator outlet temperatures. For example, the database may be represented as a lookup table containing a plurality of fan duty cycle values. In such instances, the rows may be based on the ambient air temperature while the columns are based on the radiator outlet temperature, or vise-versa. However, this is merely an example, in other examples the database may store the fan duty cycle information as key-value pairs and/or according to any other database structure. In some examples, the thermal management component may access and/or retrieve the cooling parameter data from the database.

In some examples, the thermal management component may operate a fan according to the cooling parameter (e.g., duty cycle). The vehicle may include a fan (or radiator fan) configured to increase the airflow entering the radiator, enabling the radiator to cool the coolant to lower temperatures and/or in a shorter period of time. The vehicle may include one or more fans on one or both ends of the vehicle. In such instances, the vehicle may have one or more fans disposed proximate to (upstream and/or downstream) of the radiator and/or incorporated in a radiator. In some examples, the thermal management component may operate or otherwise control the fan(s) according to the individual cooling parameter identified from the database. For example, if the vehicle includes a first fan at a first end of the vehicle and a second fan at a second end of the vehicle, the thermal management component may identify a first cooling parameter for the first fan and a second cooling parameter for the second fan. Accordingly, the thermal management component may operate the first fan according to the first cooling parameter while operating the second fan according to the second cooling parameter, which may be the same as or different than the first cooling parameter.

In some examples, the cooling parameters in the database may also take into account vehicle speed and/or direction of travel of vehicle (e.g., at which end of the vehicle, leading or trailing, is the fan disposed). Alternatively or additionally, the thermal management component may modify the cooling parameter for the fan(s) based on the speed of the vehicle, a location of the vehicle (e.g., on a highway), a speed limit associated with a road segment the vehicle is traveling on, a driving surface (e.g., road type), a speed and/or direction of wind relative to the vehicle, a level of humidity in the environment, an elevation of the environment (e.g., above sea level), and/or any other factor. For instance, the thermal management component may reduce and/or disable one or more of the fans based on the speed, location, speed limit, and/or driving surface. In some examples, upon identifying that the vehicle is located on a road surface similar to a highway or freeway (e.g., having a speed limit above a threshold value), the thermal management component may reduce or disable the fan(s) on one or both ends of the vehicle. Alternatively, the thermal management component may access a first database to retrieve cooling parameter information when such conditions are present, and access a second (different) database to retrieve cooling parameter information when such conditions are absent. In some examples, multiple different databases (2, 3, 4, . . . . N) or lookup tables may be used with a separate database or look up table for each discrete speed or range of speeds, speed limits, locations, road types, etc.

In examples, the techniques may include a computing device implementing one or more components to control operation of a fan proximate a radiator or other component of the vehicle. In some examples, a fan speed can be determined based at least in part on a drag coefficient associated with the vehicle (or portion thereof such as the radiator). Using the techniques described herein, airflow proximate a radiator and vehicle speed can be considered by a vehicle computing device configured to cool different portions of an autonomous vehicle depending on a direction of travel. By implementing the techniques described herein, safety of the autonomous vehicle can be improved by more efficiently cooling propulsions systems, computing systems, and the like.

In examples, the computing device can provide functionality to determine a cooling parameter (e.g., a fan speed for a fan coupled to the vehicle) for components in thermal communication with a radiator, a compressor, a pump, a fan, etc. The fan speed can be based at least in part on airflow data from one or more sensors of the vehicle. For example, an airflow sensor proximate a radiator can measure drag associated with a surface of the radiator, and a model can determine the fan speed accordingly. In some examples, the fan speed can be based on drag information associated with a portion of a vehicle body, such as a leading end or a trailing end of a bi-directional vehicle.

In examples, the computing device can determine a first rate of output for a first fan at a first end of a vehicle and a second rate of output for a second fan at a second end opposite the first end. Fans at opposing ends of the vehicle can run in opposite directions relative to one another to push or pull air in various examples. In some examples, the computing device can determine independent rates of output for multiple fans at a same end of the vehicle. The computing device can control a fan direction (e.g., forward or reverse), a fan speed, or other fan setting of multiple fans at different ends or sides of the vehicle including changing a fan speed and/or direction based at least in part on a direction of travel of the vehicle (or change in the direction of travel by a bi-directional vehicle). A drag coefficient associated with the first end and/or the second end of the vehicle (or radiators associated therewith) can be input into a model for determining a fan speed for a fan at one or both ends of the vehicle.

As described herein, the computing device may implement one or more machine learned models, statistical models, or a combination thereof. That is, the computing device may utilize a machine learning model that learns from a training data set to improve accuracy of an output (e.g., a prediction). Additionally, or alternatively, the computing device may utilize a statistical model that is representative of logic and/or mathematical functions that generate approximations which are usable to make predictions.

In some examples, the thermal management component may receive one or more different types of data to input into a machine-learning model trained to output a cooling parameter for the fans, vehicle HVAC system, pumps, compressors, actuators, valves, coolant loops, etc. For instance, the vehicle may include sensor devices inside and/or outside the vehicle to determine temperature, humidity, airflow speed and/or direction, direction and/or speed of vehicle travel, etc. In some examples, an ambient temperature can be determined using local weather information that may be relayed to the vehicle using external sensors (e.g., on other vehicles, using weather satellites or stations, etc.) from vehicles in addition or instead of sensors of the vehicle. In instances, the vehicle can input such sensor data into a machine-learning model trained to output operation parameters for various vehicle components. In examples, some information may be used to predict changes and preconfigure cooling systems for a vehicle prior to the vehicle entering an environment. For example, data acquired using external sensors and/or models may be used for these purposes. Additional techniques for performing such operations may be found, for example, in U.S. patent application Ser. No. 16/017,424, titled "Heating Ventilation and Air Conditioning (HVAC) System With Zonal Control" and filed Jun. 25, 2018, in U.S. patent application Ser. No. 17/737,764, titled "Heat Load Balancing In Vehicles" and filed May 5, 2022, in U.S. patent application Ser. No. 18/087,014, titled "Cooling System Assembly For Bidirectional Vehicle" which are incorporated by reference herein in their entirety and for all purposes.

In examples, instead of or in addition to radiator fans, active aero devices can be controlled to manage airflow around or through portions of the vehicle and/or radiators or other cooling components. In some examples, a tradeoff may be determined between drag introduced by an active aero component vs the ability of ambient air to cool one or more components of a vehicle's coolant loop. For example, depending on a speed or direction of a vehicle, an optimal configuration of active aero component(s) may be determined to optimize overall power consumption used by the vehicle to cool component(s) therein. In some examples, these active aero components can be controlled in relation to cooling fans, for example, to optimize fan speed and active are component configuration. In examples, an aero component may be a diverter, a spoiler, a cover for a radiator, etc. The active aero component may be able to be positioned in multiple configurations via a corresponding actuator (as opposed to a binary configuration capability). In some examples, the active aero component may be able to divert air between one or more radiators of a vehicle depending on its bidirectional mode of operation (e.g., an active aero component may divert air to a rear facing radiator of the vehicle) as disclosed in, for example, "COOLING SYSTEM ASSEMBLY FOR BIDIRECTIONAL VEHICLE," filed Dec. 22, 2022, Application Ser. No. 18/087,014.

The techniques described herein can improve the functioning, safety, and efficiency of the autonomous and semi-autonomous vehicles operating in various driving environments by evaluating ambient and/or radiator outlet temperatures to allow the vehicle to query a database for a precomputed cooling parameter while navigating an environment. The database described herein may be precomputed and include optimal fan duty cycles. As such, the database may improve vehicle safety and efficiency by improving the efficiency of the fan duty cycle which may result in less drag to the vehicle. Specifically, since the vehicle may be a bi-directional vehicle with radiators at both ends of the vehicle, and the operation of radiator fans may increase the drag experienced by the vehicle, determining an optimal fan duty cycle can reduce the amount of drag caused by the fan. As noted above, if the vehicle experiences less drag, the engine components may reduce the amount of energy consumed. The database may also enable radiator fans of different ends of the vehicle to be controlled differently and efficiently based on the radiator outlet temperature on the same end of the fan.

The techniques discussed herein can improve a functioning of a computing device of a vehicle in a number of ways. For example, the computing device may output data that causes one or more fans to operate at different rates to efficiently cool different portions of the vehicle. In some examples, the computing device may improve functioning and safety of the vehicle by determining optimal times for cooling components that, by remaining relatively cool, improve perception, prediction, and/or planning operations which can ultimately lead to safer performance of the vehicle. Further, an output from the computing device can be stored and used at a later time to save an amount of memory resources and/or computational resources required to generate efficiently cool a component. In addition, the techniques described herein can improve passenger comfort and/or vehicle safety such as, for example, maintaining an ambient temperature in a passenger compartment.

The techniques described herein can be implemented in a number of ways. Example implementations are provided below with reference to the following figures. Although discussed in the context of an autonomous vehicle, the methods, apparatuses, and systems described herein can be applied to a variety of systems and is not limited to autonomous vehicles. In another example, the techniques can be utilized in an aviation or nautical context, or in any system using sensor data. Additionally, the techniques described herein can be used with real data (e.g., captured using sensor(s)), simulated data (e.g., generated by a simulator), or any combination of the two.

FIG. 1 is a pictorial flow diagram illustrating an example process 100 for determining an ambient temperature, determining a radiator coolant outlet temperature, determining a cooling parameter based on the ambient and radiator outlet temperatures, and operating a fan based on the cooling parameter. As shown in this example, some or all operations in the example process 100 may be performed by a thermal management component 102 integrated within a perception component, a prediction component, a planning component, and/or any other component and system within an autonomous vehicle. For instance, as shown in this example, example process 100 may be implemented using a thermal management component 102. As described in more detail below, the thermal management component 102 may include various components, which may be configured to determine or otherwise receive ambient and radiator outlet temperatures, determine a fan engagement value (e.g., cooling parameter), and/or operating the fan based on the engagement value.

At operation 104, the thermal management component 102 may determine an ambient air temperature. In some examples, a vehicle may include multiple sensor devices mounted at various locations and various angles relative to the vehicle, to capture ambient temperature data of a driving environment. For example, box 106 illustrates an autonomous vehicle 108 capturing sensor data of the ambient air temperature. In examples, the autonomous vehicle 108 may include a sensor device 110 mounted or otherwise installed at an end of the vehicle; however, in other examples, the sensor device 110 may be located at a different position on the autonomous vehicle 108. For instance, the sensor device 110 may alternatively be located on either horizontal or vertical end of the vehicle and/or within the one or more of the sensor pods disposed at a top portion of the vehicle 108. In some examples, the sensor device 110 may capture an ambient temperature 112 proximate the sensor device 110. In such instances, the ambient temperature 112 may represent the temperature of the air external to the vehicle and proximate the sensor device 110.

At operation 114, the thermal management component 102 may determine a radiator outlet temperature. In some examples, the autonomous vehicle 108 may include a radiator, a radiator fan, and/or a sensor device to determine the radiator coolant outlet temperature (e.g., the temperature of the coolant exiting the radiator). For example, box 116 illustrates the autonomous vehicle 108 capturing sensor data representative of the radiator coolant outlet temperature. In this example, the autonomous vehicle 108 may include a radiator 118 and a radiator 120. As shown, the radiator 118 may be on a first end of the autonomous vehicle 108 and the radiator 120 may be on a second (and opposite) end of the autonomous vehicle 108. The radiator 118 may be responsible for cooling component(s) of the battery, motor, computer and/or cabin that are located on same end as the radiator 118. The radiator 120 may be responsible for cooling component(s) of the battery, motor, computer and/or cabin that are located on the same end of the autonomous vehicle 108 as the radiator 120.

In this example, the autonomous vehicle 108 may include a radiator fan proximate (e.g., mechanically connected, horizontally adjacent, etc.) the radiator 118 and a radiator fan proximate the radiator 120. As shown, the vehicle 108 may include a single radiator fan proximate the radiator 118 and a single radiator fan proximate the radiator 120; however, in other examples the vehicle 108 may include more or less radiator fans on either side of the vehicle 108 and/or located in different positions with respect to the radiators. In such instances, the radiator fans may be activated to increase the airflow through the radiator(s) to enable the radiator(s) to cool the coolant to lower temperatures and/or at a faster speed.

In this example, the autonomous vehicle 108 may include a sensor device coupled to the radiator or at any position along the coolant line extending between the radiator and the thermal component(s). The vehicle 108 may include a first sensor device located proximate the radiator 118 and a second sensor device located proximate the radiator 120. In some examples, the sensor device may be configured to determine a coolant temperature. As such, the vehicle 108 may receive a first radiator coolant outlet temperature corresponding to the radiator 118 and a second radiator coolant outlet temperature corresponding to the radiator 120.

At operation 122, the thermal management component 102 may determine a cooling parameter based on the ambient temperature and the radiator outlet temperature. In some examples, the autonomous vehicle 108 may include a database that contains optimal cooling rates for the radiator fans. The vehicle 108 may access the database to retrieve an optimal cooling rate based on the ambient temperature determined at operation 104 and the radiator outlet temperature(s) determined at operation 114. For example, box 124 illustrates a database represented as a lookup table. In this example, the box 124 includes an ambient temperature 126 determined at operation 104 and a radiator outlet temperature 128 determined at operation 114. The ambient temperature 126 may be 35 degrees and the radiator outlet temperature 128 may be 40 degrees.

In this example, the lookup table may be organized based on ambient and radiator outlet temperatures. As shown, the rows of the lookup table may be based on the ambient temperatures 130 and the columns of the lookup table may be based on the radiator outlet temperatures 132. The lookup table may include multiple cells containing optimal cooling rates for radiator fans. As such, to determine an optimal cooling parameter for a specific radiator fan, the vehicle may identify the cell intersecting with the column corresponding to the radiator outlet temperature 128 and the row corresponding to the ambient temperature 126. In this case, the vehicle 108 may determine that cell 134 is the optimal cooling parameter based on the ambient temperature 126 and the radiator outlet temperature 128. Though FIG. 1 illustrates a single radiator outlet temperature 128, in other examples there may be more radiator outlet temperatures. Additional details for determining cooling rates are described with respect to FIGS. 2 and 4. Although FIG. 1 describes determining the optimal cooling parameter based on accessing a lookup table, in other examples the thermal management component 102 may determine the cooling parameter based on inputting the ambient temperature and the radiator outlet temperatures into a machine-learning model trained to output cooling parameters.

At operation 136, the thermal management component 102 may operate the fan based on the cooling parameter. For example, box 138 illustrates radiator fan(s) pulling air through the radiator according to the cooling parameter determined at operation 122. In some examples, the thermal management component 102 may determine similar or different cooling parameters for different fans since the radiator coolant outlet temperature may differ based on the direction of travel. The thermal management component 102 may modify the radiator fan cooling rates while navigating through an environment.

Figure 2:
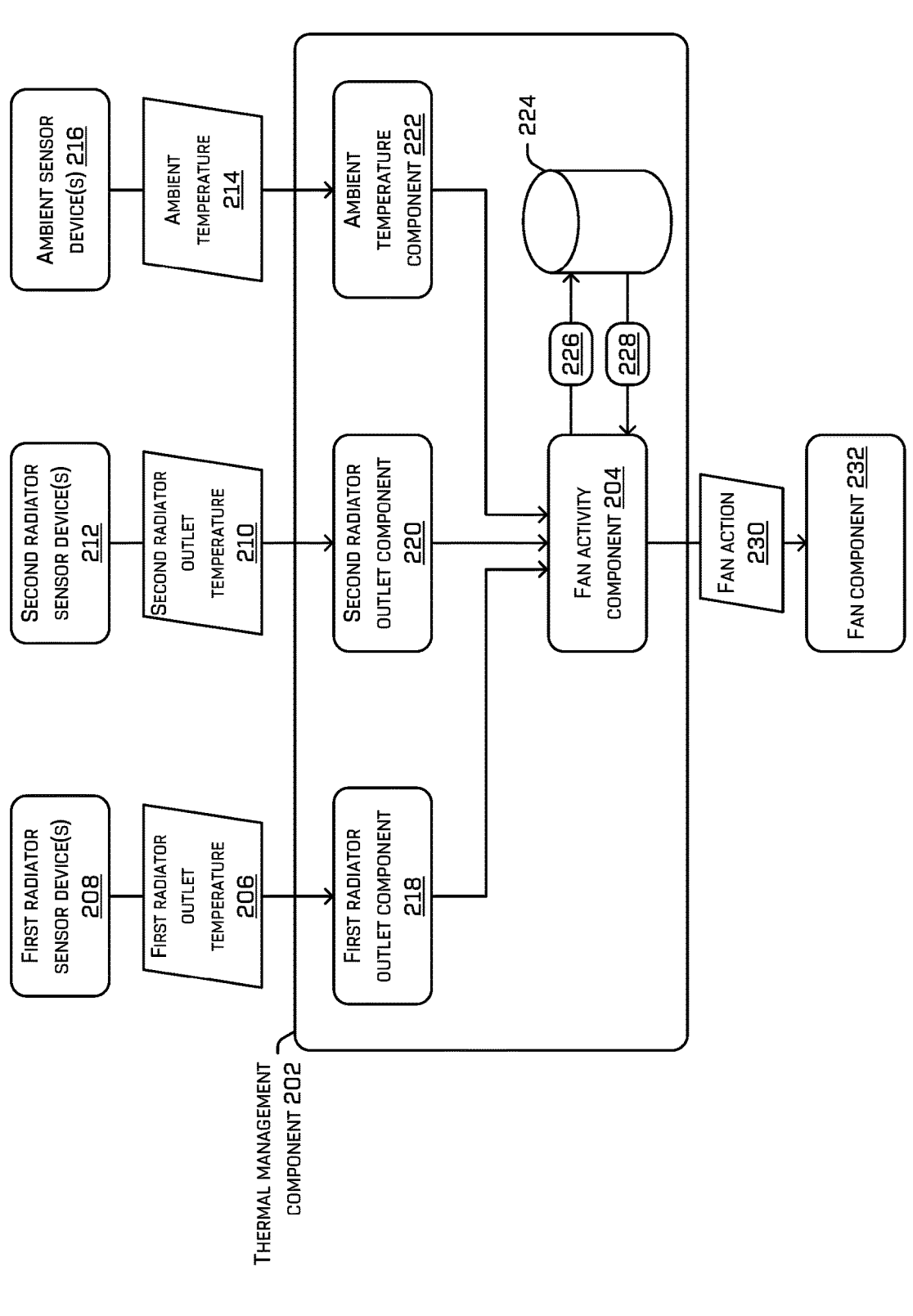
FIG. 2 illustrates an example computing system including a thermal management component configured to optimize a fan cooling parameter to reduce energy consumption, in accordance with one or more examples of the disclosure.

FIG. 2 illustrates an example computing system 200 including a thermal management component 202 configured to optimize a fan duty cycle to reduce energy consumption.

In some examples, the thermal management component 202 may be similar or identical to the thermal management component 102 described above, or in any other examples herein. As noted above, in some cases the thermal management component 202 may be implemented within or otherwise associated with a perception component, a prediction component, a planning component, and/or any other component of an autonomous vehicle. In some examples, the thermal management component may include various components, described below, configured to perform different functionalities of cooling technique. In some examples, some or all subcomponents of the thermal management component 202 may integrated in an on-vehicle system while other subcomponents may be integrated in a remote server-based system. In some examples, the thermal management component 202 may include a fan activity component 204 configured to determine an optimal radiator fan cooling rate.

In some examples, the thermal management component 202 may receive sensor data from one or more sensor device(s) within (or otherwise associated with) an autonomous vehicle. For example, the thermal management component 202 may receive sensor data representing a first radiator outlet temperature 206 from a first radiator sensor device 208, sensor data representing a second radiator outlet temperature 210 from a second radiator sensor device 212, and/or sensor data representing an ambient temperature 214 from an ambient sensor device 216. The different sensor devices may be mounted or installed at different locations on and/or within the autonomous vehicle, and may include various types of sensor devices. In some examples, the ambient sensor device 216 may be located and/or mounted on any external portion of the vehicle. The first radiator sensor device 208 may be a thermocouple device that may be disposed or otherwise affixed to a first radiator (at a first end of the vehicle) or at any other portion of the coolant line extending between the first radiator and the engine components of the first end of the vehicle. The second radiator sensor device 212 may be a thermocouple device that may be disposed or otherwise affixed to a second radiator (at a second end opposite the first end) or at any other portion of the coolant line extending between the second radiator and the engine components of the second end of the vehicle. As shown in FIG. 2, the first radiator sensor device 208, the second radiator sensor device 212, and/or the ambient sensor device 216 may provide the first radiator outlet temperature 206 which may be a temperature and/or a voltage level (e.g., signal), the second radiator outlet temperature 210 which may be a temperature and/or a voltage level (e.g., signal), and/or the ambient temperature 214 which may be a temperature and/or a voltage level (e.g., signal) to the thermal management component 202. In some examples, if the sensor devices send a voltage or voltage level to the thermal management component 202, the thermal management component 202 may determine, based on the received voltage, a temperature associated thereto.

In some examples, the thermal management component 202 may include a first radiator outlet component 218 configured to receive, store, and/or synchronize first radiator outlet temperature 206 from the first radiator sensor device 208, a second radiator outlet component 220 configured to receive, store, and/or synchronize second radiator outlet temperature 210 from the second radiator sensor device 212, and/or an ambient temperature component 222 configured to receive, store, and/or synchronize ambient temperature 214 from the ambient sensor device 216. Though FIG. 2 illustrates two radiator sensor devices and a single ambient sensor device, in other examples there may be more or less radiator sensor devices and/or ambient sensor devices.

In some examples, the thermal management component 202 may include a fan activity component 204 configured to determine an optimal radiator fan cooling rate. The fan activity component 204 may receive the first radiator outlet temperature 206, the second radiator outlet temperature 210, and/or the ambient temperature 214 from the first radiator outlet component 218, the second radiator outlet component 220, and/or the ambient temperature component 222, respectively. In some examples, upon receiving such sensor data, the fan activity component 204 may determine whether to engage the one or more radiator fans to assist in lowering the temperature of the coolant.

In such instances, the fan activity component 204 may determine whether the first radiator outlet temperature 206 and/or the second radiator outlet temperature 210 meet or exceed a threshold value. In some examples, the threshold value may be five degrees and as such, if the first radiator outlet temperature 206 and/or the second radiator outlet temperature 210 are at least five degrees higher than the ambient temperature 214, the fan activity component 204 may cause one or more radiator fans to operate. That is, the fan activity component 204 may cause a fan that corresponds to the radiator which produced the coolant outlet temperature meeting or exceeding the threshold to engage.

In some examples, the fan activity component 204 may access, request, or otherwise receive a cooling parameter (e.g., fan duty cycle) from a database 224. That is, upon determining that the first radiator outlet temperature 206 and/or the second radiator outlet temperature 210 meet or exceed the threshold value, the fan activity component 204 may send a request 226 to the database 224 requesting an optimal fan duty cycle based on the associating temperatures. In some examples, the request 226 may include the ambient temperature 214, the first radiator outlet temperature 206 with an associating first fan identifier corresponding to the fan of the radiator producing the first radiator outlet temperature 206, and/or the second radiator outlet temperature 210 with an associating second fan identifier corresponding to the fan of the radiator producing the second radiator outlet temperature 210. In some examples, the database 224 may provide the fan activity component 204 with a cooling parameter 228 corresponding to the first fan identifier and another corresponding to the second fan identifier.

In some examples, the database 224 may include an optimal fan duty cycle based on a specific ambient and/or radiator outlet temperature. As noted above, the database 224 may be represented as a lookup table or as key-value pairs. A system of the vehicle may determine an optimal fan duty cycle based on various ambient and radiator outlet temperature combinations. In such instances, when determining the optimal fan duty cycle, the system may evaluate various factors, such as the direction of travel (e.g., radiator airflow on the leading end may cause greater drag as compared to the trailing side, total batter power consumption may increase with an increase in fan duty cycle, a higher fan duty cycle on the trailing end may reduce the overall energy consumption), a targeted (e.g., desired) radiator coolant outlet temperature, a minimum fan duty cycle, a velocity of the vehicle, a maximum fan duty cycle, and/or any other factors. In some examples, for some or all ambient and radiator outlet temperature combinations, the system may determine an optimal fan duty cycle that sufficiently cools the engine components while minimizing drag.

In such instances, upon receiving the cooling parameter 228, the fan activity component 204 may send the cooling parameter 228 as a fan action 230 to the fan component 232. In such examples, based on receiving the fan action 230 from the fan activity component 204, the fan component 232 may operate or otherwise control the first fan and/or the second fan based on the fan action 230. However, these examples are not intended to be limiting, in other examples there may be more than one fan action sent to the fan component 232. Such fan actions may be an optimal fan action for the specific fan.

Figure 3:
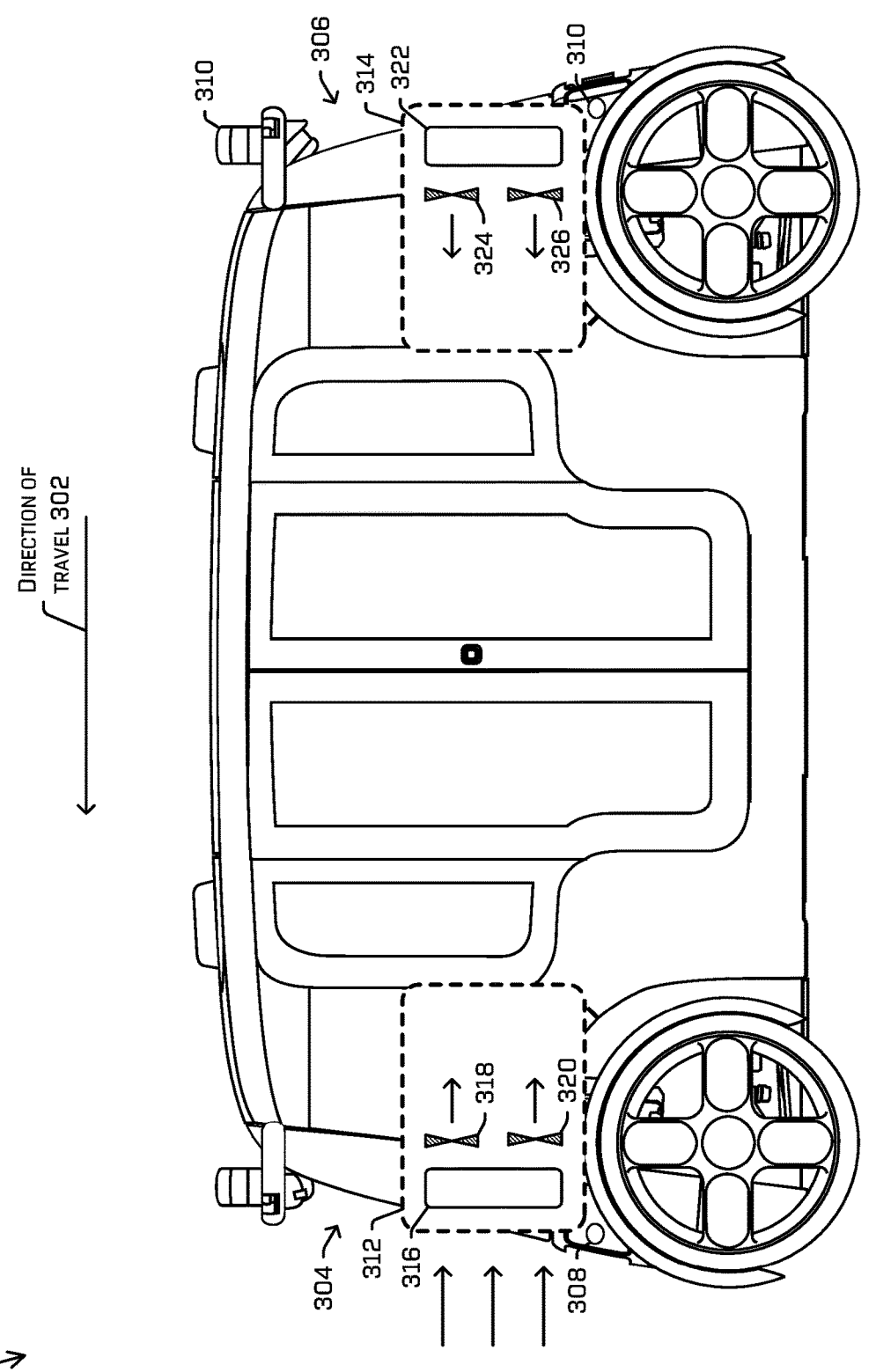
FIG. 3 illustrates an example vehicle including multiple radiators and radiator fans, in accordance with one or more examples of the disclosure.

FIG. 3 illustrates an example vehicle 300 including multiple radiators and radiator fans.

In this example, the example vehicle 300 may be similar or identical to the vehicle 108 described in FIGS. 1 and 2. In some examples, the vehicle 300 may be a bi-directional vehicle with both ends capable of being a leading or trailing end. In this example, the direction of travel 302 may be shown above the vehicle 300. As such, based on the direction of travel 302, the vehicle 300 may include a first end 304 (first longitudinal end) which may be leading end and a second end 306 (second longitudinal end) which may be a trailing end.

In some examples, the vehicle 300 may include a plurality of sensor systems located at various positions on or within the vehicle 300. As shown, the vehicle 300 may include a first sensor system 308 located on an external portion of the leading end 304 of the vehicle 300. The vehicle 300 may also include a second sensor system 310 located on an external portion of the trailing end 306 of the vehicle 300. In some examples, the first sensor system 308 and the second sensor system 310 may be configured to capture sensor data indicative of the ambient air temperature proximate the vehicle 300.

In some examples, the vehicle 300 may include a multiple battery/motor compartments containing various components. As shown in FIG. 3, the vehicle 300 may include a first battery compartment 312 located at the leading end 304 of the vehicle 300 and a second battery compartment 314 located at the trailing end 306. In this example, the first battery compartment 312 may include a radiator 316, a first fan 318, and a second fan 320. The radiator 316 may be configured to cool down the battery and/or motor components located in the first battery compartment 312. Further, the first fan 318 and the second fan 320 may pull air through the radiator 316 to increase the airflow through the radiator 316. In such instances, the first fan 318 and the second fan 320 may operate independent of one another; however, in other examples the first and second fans may operate in concert.

In this example, the second battery compartment 314 may include a radiator 322, a first fan 324, and a second fan 326. The radiator 322 may be configured to cool down the battery and/or motor components located in the battery engine compartment 314. Further, the first fan 324 and the second fan 326 may pull air through the radiator 322 to increase the airflow through the radiator 322. In such instances, the first fan 324 and the second fan 326 may operate independent of one another; however, in other examples the first and second fans may operate in concert.

In some examples, the first battery compartment 312 and the second battery compartment 314 may include sensor devices (located proximate the radiators) configured to determine a radiator coolant outlet temperature. That is, the first engine compartment 312 may include a sensor device coupled to the radiator 316 or along a portion of the coolant line. The sensor device may be configured to detect the coolant outlet temperature from the radiator 316. In this example, the first engine compartment 312 may include more than one sensor configured to provide a coolant outlet temperature at various locations along the radiator 316. In some instances, such sensors may correspond to specific radiator fans. As such, the vehicle may operate the radiator fans independently based on the ambient temperature and the radiator outlet temperature captured by the fan's corresponding sensor device. In some instances, a similar battery compartment structure and/or functionality as discussed with respect to the first engine compartment 312 applies to the second battery compartment 314.

In some examples, the vehicle 300 may determine an optimal fan cooling rate for some or all radiator fans. In such instances, the vehicle 300 may determine the optimal cooling parameter for each fan based on an ambient temperature (captured by the first sensor system 308 or the second sensor system 310) and a first radiator outlet temperature corresponding to the radiator 316 and the radiator 322. In such instances, upon determining the cooling parameters for each specific fan, the vehicle 300 may control the fans according to the cooling parameter.

Figure 4:
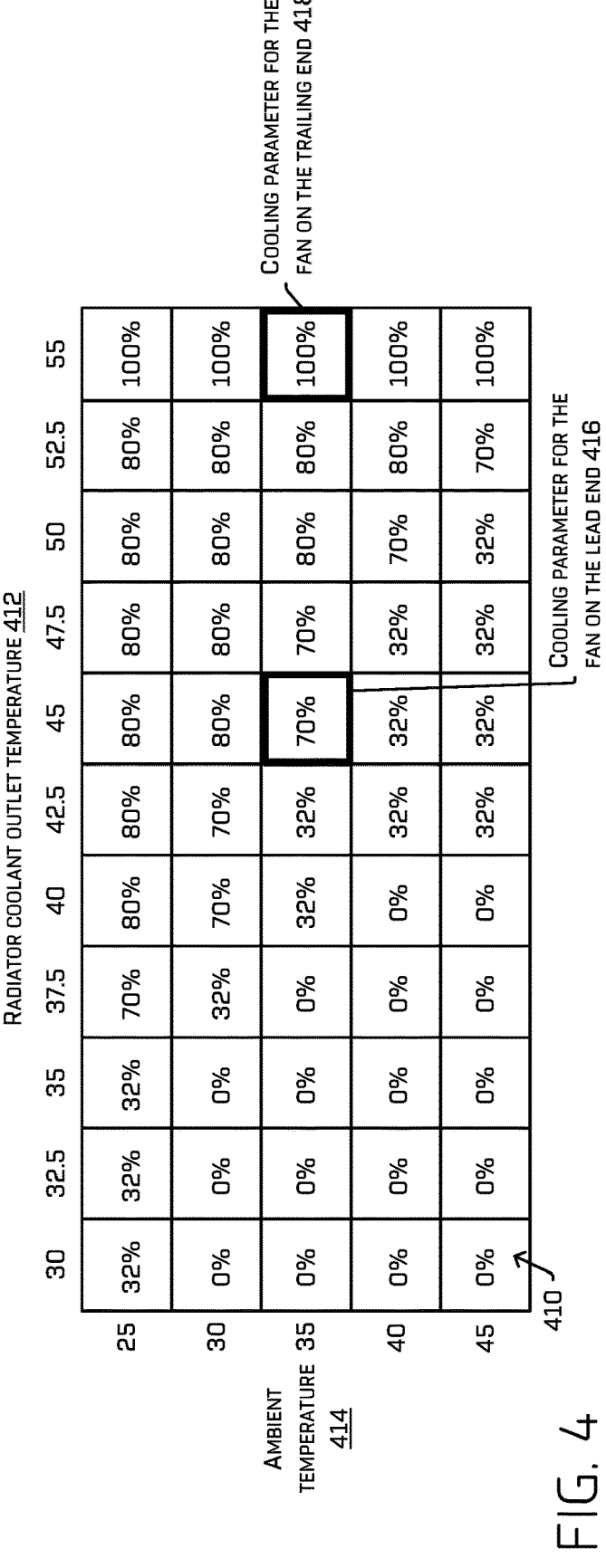
FIG. 4 illustrates an example database represented as a lookup table containing a fan cooling parameter determined based at least in part on an ambient air temperature and a radiator coolant outlet temperature, in accordance with one or more examples of the disclosure.

FIG. 4 illustrates an example lookup table 400 of a database containing an optimal fan cooling rate (e.g., duty cycle) determined based on an ambient air temperature and a radiator coolant outlet temperature.

In this example, the lookup table 400 may be similar or identical to the lookup table described in FIGS. 1 and 2. In some examples, FIG. 4 shows a box 402 including a plurality of temperatures. Specifically, box 402 includes a radiator rear temperature 404 (e.g., radiator located at a trailing end of the vehicle), an ambient temperature 406, and a radiator lead temperature 408 (e.g., radiator located at the leading end of the vehicle). The radiator rear temperature 404 may be 55 degrees, the ambient temperature 406 may be 35 degrees, and the radiator lead temperature 408 may be 45 degrees. In some examples, the vehicle may use such temperature data to retrieve two distinct fan duty cycles from the lookup table 400.

In some examples, the example lookup table 400 may include multiple cells 410. For example, the lookup table 400 may include five rows of cells 410 and eleven columns of cells 410. Of course, in other examples the lookup table 400 may include more or less rows and/or columns. As shown in FIG. 4, the cells 410 may include a value that indicates an optimal fan duty cycle based on the ambient and radiator outlet temperatures. As shown, the columns (x-axis) of the lookup table 400 may be based on radiator coolant outlet temperature 412 and the rows (y-axis) of the lookup table 400 may be based on ambient temperature 414.

Accordingly, to identify the optimal fan duty cycle, the vehicle may identify the radiator coolant outlet temperature 412 column that corresponds to the received radiator outlet temperature, identify the ambient temperature 414 row that corresponds to the received ambient temperature, and identify the intersecting cell between the column and row. As shown, cell 416 may be the optimal cooling parameter for the radiator fan on the leading end of the vehicle. In this example, the cell 416 may intersect the column with a radiator coolant outlet temperature 412 of 45 which corresponds to the radiator lead temperature 408 and the row having an ambient temperature 414 of 35 which corresponds to the ambient temperature 406. In this case, the optimal cooling parameter, as shown in cell 416, for the radiator fan on the leading end is 70%. Additionally, cell 418 may be the optimal cooling parameter for the radiator fan on the trailing end of the vehicle. This example, the cell 418 may intersect the column with a radiator coolant outlet temperature 412 of 55 which corresponds to the radiator rear temperature 404 and the row having an ambient temperature 414 of 35 which corresponds to the ambient temperature 406. In this case, the optimal cooling parameter, as shown in cell 418, for the radiator fan on the trailing end is 100%.

In other examples, the vehicle may determine the optimal cooling parameter based on a relative radiator coolant outlet temperature. Though the example lookup table 400 illustrates cooling parameters determined based on individual radiator coolant temperatures, in other examples, the example lookup table 400 may be a three or more dimensional table including relative coolant outlet temperatures. For instance, the vehicle may determine a first radiator outlet temperature for one end of the vehicle and determine a second radiator outlet temperature for the other end of the vehicle. In such situations, the vehicle can determine a relative radiator outlet temperature based on comparing the first and second radiator outlet temperatures. The vehicle could then access the two—or—three dimensional lookup table to retrieve the optimal cooling parameter based on the relative radiator outlet temperature.

Figure 5:
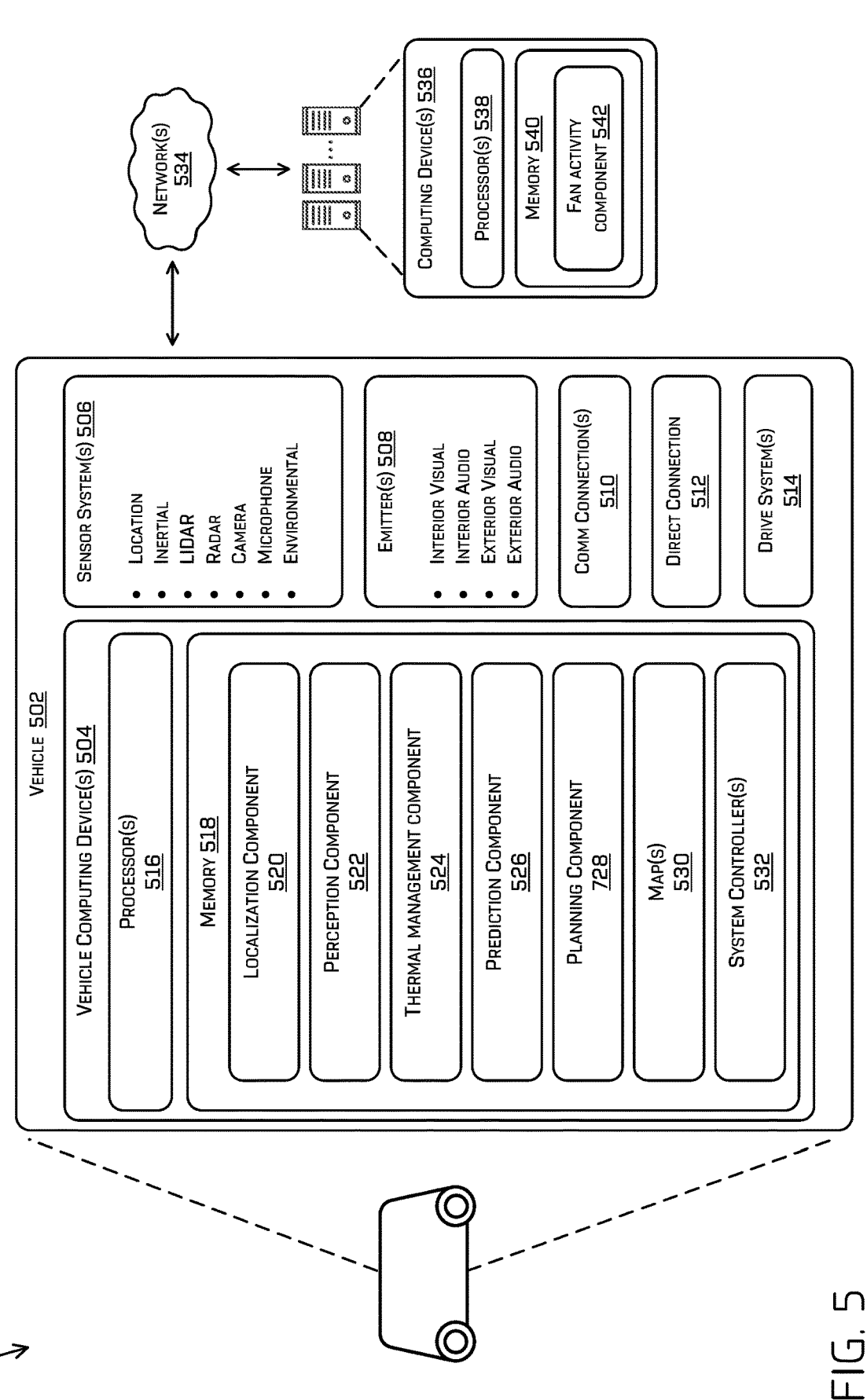
FIG. 5 depicts a block diagram of an example system for implementing the techniques described herein.

FIG. 5 is a block diagram of an example system 500 for implementing the techniques described herein. In at least one example, the system 500 may include a vehicle, such as vehicle 502. The vehicle 502 may include one or more vehicle computing devices 504, one or more sensor systems 506, one or more emitters 508, one or more communication connections 510, at least one direct connection 512, and one or more drive systems 514.

The vehicle computing device 504 may include one or more processors 516 and memory 518 communicatively coupled with the processor(s) 516. In the illustrated example, the vehicle 502 is an autonomous vehicle; however, the vehicle 502 could be any other type of vehicle, such as a semi-autonomous vehicle, or any other system having at least an image capture device (e.g., a camera-enabled smartphone). In some instances, the autonomous vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 502 may be a fully or partially autonomous vehicle having any other level or classification.

In the illustrated example, the memory 518 of the vehicle computing device 504 stores a localization component 520, a perception component 522, a thermal management component 524, a prediction component 526, a planner component 528, one or more system controllers 532, and one or more maps 530 (or map data). Though depicted in FIG. 5 as residing in the memory 518 for illustrative purposes, it is contemplated that the localization component 520, the perception component 522, the prediction component 526, the planner component 528, thermal management component 524, system controller(s) 532, and/or the map(s) may additionally, or alternatively, be accessible to the vehicle 502 (e.g., stored on, or otherwise accessible by, memory remote from the vehicle 502, such as, for example, on memory 540 of one or more computing device 536). In some examples, the memory 540 may include a fan activity component 542.

In at least one example, the localization component 520 may include functionality to receive sensor data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment, such as from map(s) 530, and may continuously determine a location and/or orientation of the vehicle 502 within the environment. In some instances, the localization component 520 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 502. In some instances, the localization component 520 may provide data to various components of the vehicle 502 to determine an initial position of the vehicle 502 for determining the relevance of an object to the vehicle 502, as discussed herein.

In some instances, the perception component 522 may include functionality to perform object detection, segmentation, and/or classification. In some examples, the perception component 522 may provide processed sensor data that indicates a presence of an object (e.g., entity) that is proximate to the vehicle 502 and/or a classification of the object as an object type (e.g., car, pedestrian, cyclist, animal, building, tree, road surface, curb, sidewalk, unknown, etc.). In some examples, the perception component 522 may provide processed sensor data that indicates a presence of a stationary entity that is proximate to the vehicle 502 and/or a classification of the stationary entity as a type (e.g., building, tree, road surface, curb, sidewalk, unknown, etc.). In additional or alternative examples, the perception component 522 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 526 may generate one or more probability maps representing prediction probabilities of possible locations of one or more objects in an environment. For example, the prediction component 526 may generate one or more probability maps for vehicles, pedestrians, animals, and the like within a threshold distance from the vehicle 502. In some instances, the prediction component 526 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 526 may generate predicted trajectories of objects (e.g., objects) in an environment. For example, the prediction component 526 may generate one or more predicted trajectories for objects within a threshold distance from the vehicle 502. In some examples, the prediction component 526 may measure a trace of an object and generate a trajectory for the object based on observed and predicted behavior.

In general, the planner component 528 may determine a path for the vehicle 502 to follow to traverse through an environment. For example, the planner component 528 may determine various routes and trajectories and various levels of detail. For example, the planner component 528 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 528 may generate an instruction for guiding the vehicle 502 along at least a portion of the route from the first location to the second location. In at least one example, the planner component 528 may determine how to guide the vehicle 502 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 528 may select a trajectory for the vehicle 502.

In other examples, the planner component 528 may alternatively, or additionally, use data from the localization component 520, the perception component 522, and/or the prediction component 526 to determine a path for the vehicle 502 to follow to traverse through an environment. For example, the planner component 528 may receive data (e.g., object data) from the localization component 520, the perception component 522, and/or the prediction component 526 regarding objects associated with an environment. In some examples, the planner component 528 receives data for relevant objects within the environment. Using this data, the planner component 528 may determine a route to travel from a first location (e.g., a current location) to a second location (e.g., a target location) to avoid objects in an environment. In at least some examples, such a planner component 528 may determine there is no such collision-free path and, in turn, provide a path that brings vehicle 502 to a safe stop avoiding all collisions and/or otherwise mitigating damage.

The thermal management component 524 may be perform any of the techniques described with respect to any of FIGS. 1-4 above with respect to determining an optimal radiator fan duty cycle.

In at least one example, the vehicle computing device 504 may include one or more system controllers 532, which may be configured to control steering, propulsion, braking, safety, emitters, communication, and other systems of the vehicle 502. The system controller(s) 532 may communicate with and/or control corresponding systems of the drive system(s) 514 and/or other components of the vehicle 502.

The memory 518 may further include one or more maps 530 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 502 may be controlled based at least in part on the map(s) 530. That is, the map(s) 530 may be used in connection with the localization component 520, the perception component 522, the prediction component 526, and/or the planner component 528 to determine a location of the vehicle 502, detect objects in an environment, generate routes, determine actions and/or trajectories to navigate within an environment.

In some examples, the one or more maps 530 may be stored on a remote computing device(s) (such as the computing device(s) 536) accessible via network(s) 534. In some examples, multiple maps 530 may be stored based on, for example, a characteristic (e.g., type of entity, time of day, day of week, season of the year, etc.). Storing multiple maps 530 may have similar memory requirements, but increase the speed at which data in a map may be accessed.

In some instances, aspects of some or all of the components discussed herein may include any models, techniques, and/or machine-learned techniques. For example, in some instances, the components in the memory 518 (and the memory 540, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEIT), visual bidirectional encoder from transformers (VisualBERT), image generative pretrained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, topdown feature layers (e.g., see U.S. patent application Ser. No. 15/963,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

In at least one example, the sensor system(s) 506 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 506 may include multiple instances of each of these or other types of sensors. For instance, the lidar sensors may include individual lidar sensors located at the corners, front, back, sides, and/or top of the vehicle 502. As another example, the camera sensors may include multiple cameras disposed at various locations about the exterior and/or interior of the vehicle 502. The sensor system(s) 506 may provide input to the vehicle computing device 504. Additionally, or in the alternative, the sensor system(s) 506 may send sensor data, via the one or more networks 534, to the one or more computing device(s)

536 at a particular frequency, after a lapse of a predetermined period of time, in near real-time, etc.

The vehicle 502 may also include one or more emitters 508 for emitting light and/or sound. The emitter(s) 508 may include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 may also include one or more communication connections 510 that enable communication between the vehicle 502 and one or more other local or remote computing device(s). For instance, the communication connection(s) 510 may facilitate communication with other local computing device(s) on the vehicle 502 and/or the drive system(s) 514. Also, the communication connection(s) 510 may allow the vehicle to communicate with other nearby computing device(s) (e.g., computing device 536, other nearby vehicles, etc.) and/or one or more remote sensor system(s) for receiving sensor data. The communications connection(s) 510 also enable the vehicle 502 to communicate with a remote teleoperations computing device or other remote services.

The communications connection(s) 510 may include physical and/or logical interfaces for connecting the vehicle computing device 504 to another computing device or a network, such as network(s) 534. For example, the communications connection(s) 510 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 may include one or more drive systems 514. In some examples, the vehicle 502 may have a single drive system 514. In at least one example, if the vehicle 502 has multiple drive systems 514, individual drive systems 514 may be positioned on opposite ends of the vehicle 502 (e.g., the front and the rear, etc.). In at least one example, the drive system(s) 514 may include one or more sensor systems to detect conditions of the drive system(s) 514 and/or the surroundings of the vehicle 502. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 514. In some cases, the sensor system(s) on the drive system(s) 514 may overlap or supplement corresponding systems of the vehicle 502 (e.g., sensor system(s) 506).

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 514. Furthermore, the drive system(s) 514 may also include one or more communication connection(s) that enable communication by the respective drive module with one or more other local or remote computing device(s).

In at least one example, the direct connection 512 may provide a physical interface to couple the one or more drive system(s) 514 with the body of the vehicle 502. For example, the direct connection 512 may allow the transfer of energy, fluids, air, data, etc. between the drive system(s) 514 and the vehicle. In some instances, the direct connection 512 may further releasably secure the drive system(s) 514 to the body of the vehicle 502.

In at least one example, the localization component 520, the perception component 522, the thermal management component 524, the prediction component 526, the planner component 528, the one or more system controllers 532, and the one or more maps 530 may process sensor data, as described above, and may send their respective outputs, over the one or more network(s) 534, to the computing device(s) 536. In at least one example, the localization component 520, the perception component 522, the thermal management component 524, the prediction component 526, the planner component 528, the one or more system controllers 532, and the one or more maps 530 may send their respective outputs to the computing device(s) 536 at a particular frequency, after a lapse of a predetermined period of time, in near real-time, etc.

In some examples, the vehicle 502 may send sensor data to the computing device(s) 536 via the network(s) 534. In some examples, the vehicle 502 may receive sensor data from the computing device(s) 536 and/or remote sensor system(s) via the network(s) 534. The sensor data may include raw sensor data and/or processed sensor data and/or representations of sensor data. In some examples, the sensor data (raw or processed) may be sent and/or received as one or more log files.

The computing device(s) 536 may include processor(s) 538 and a memory 540, which may include a fan activity component 542. In some examples, the memory 540 may store one or more of components that are similar to the component(s) stored in the memory 518 of the vehicle 502. In such examples, the computing device(s) 536 may be configured to perform one or more of the processes described herein with respect to the vehicle 502. In some examples, the fan activity component 542 may perform substantially similar functions as the thermal management component 524.

The processor(s) 516 of the vehicle 502 and the processor(s) 538 of the computing device(s) 536 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518 and memory 540 are examples of non-transitory computer-readable media. The memory 518 and memory 540 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 7 is illustrated as a distributed system, in alternative examples, components of the vehicle 502 may be associated with the computing device(s) 536 and/or components of the computing device(s) 536 may be associated with the vehicle 502. That is, the vehicle 502 may perform one or more of the functions associated with the computing device(s) 536, and vice versa. The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

FIG. 6 is a flow diagram illustrating an example process 600 of determining ambient and radiator coolant outlet temperatures, determining a cooling parameter based on such temperatures, and operating a fan based on the cooling parameter. As described below, the process 600 may be performed by one or more computer-based components configured to implement various functionalities described herein. For instance, some or all of the operations of process 600 may be performed by a thermal management component 202. As described above, a thermal management component 202 may be integrated as an on-vehicle system in some examples. However, in other examples, the thermal management component 202 may be integrated as a separate server-based system.

Process 600 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 602, the thermal management component may receive first sensor data representing an ambient air temperature. Ambient air may be air that is external to the vehicle and/or external to the engine compartment (e.g., outdoor air). In some examples, the vehicle may include multiple sensor devices configured to receive sensor data indicative of the ambient air temperature proximate the sensor device. Further, each sensor device may provide unique sensor data representative of the ambient air temperature proximate the sensor device.

At operation 604, the thermal management component may receive second sensor data representing an outlet temperature of a radiator of a vehicle. The radiator(s) may include a sensor device configured to receive sensor data representing the radiator coolant outlet temperature. In some examples, the sensor device may be a thermocouple device that is disposed on or otherwise affixed to the radiator or any portion of the coolant line. The thermocouple may be configured to measure the temperature of the coolant. In some examples, if the vehicle includes a radiator disposed at each end of the vehicle, the thermal management component may determine or otherwise receive, from two separate thermocouple devices, two radiator coolant outlet temperatures. In such instances, the first coolant outlet temperature may correspond to the coolant outlet temperature by the radiator on the leading end while the second coolant outlet temperature represents the coolant outlet temperature of the radiator on the trailing end of the vehicle.

At operation 606, the thermal management component may determine a threshold based on the first sensor data and the second sensor data. For instance, upon determining the ambient and radiator outlet temperatures, the thermal management component may determine whether the radiator outlet temperature meets or exceeds a threshold range. As an example, the thermal management component may activate the radiator fan if the radiator outlet temperature is at least five degrees (e.g., the threshold) above the ambient temperature. Of course this is merely an example, the threshold value may be higher or lower.

At operation 608, the thermal management component may determine whether the second sensor data meets or exceeds the threshold value. If the radiator outlet temperature does not meet or exceed the threshold value (608: No), the thermal management component may return the operation 602. In such instances, the thermal management may continue evaluating the temperatures while the vehicle navigates the environment.

In contrast, if the radiator outlet temperature meets or exceeds the threshold value (608: Yes), the thermal management component may determine a cooling parameter for a fan associated with the radiator. At operation 610, the thermal management component may determine a cooling parameter for a fan associated with the radiator. A cooling parameter may include a duty cycle (e.g., the percentage of time the fan is operating) of the fan and/or a speed of the fan. In some examples, the thermal management component may include a database that contains a specific cooling parameter for the fan based on a particular ambient and radiator outlet temperatures. For example, the database may be represented as a lookup table containing a plurality of fan duty cycle values. In such instances, the rows may be based on the ambient air temperature while the columns are based on the radiator outlet temperature, or visa-versa.

At operation 612, the thermal management component may operate the fan based on the cooling parameter. The vehicle may include a fan (or radiator fan) configured to increase the airflow entering the radiator, enabling the radiator to cool the coolant to lower temperatures and in a shorter period of time. The vehicle may include one or more fans on one or both ends of the vehicle. In such instances, the vehicle may have a fan disposed proximate to and/or incorporated in a radiator. In some examples, the thermal management component may operate or otherwise control the fans according to the individual cooling parameter identified from the database. For example, if the vehicle includes a first fan at a first end of the vehicle and a second fan at a second end of the vehicle, the thermal management component may identify a first cooling parameter for the first fan and a second cooling parameter for the second fan. Accordingly, the thermal management component may operate the first fan according to the first cooling parameter while operating the second fan according to the second cooling parameter.

EXAMPLE CLAUSES

A: A vehicle comprising: a first radiator associated with a first end of the vehicle; a first fan associated with the first end and configured to cool the first radiator; a second radiator associated with a second end of the vehicle, wherein the second end is opposite the first end; a second fan associated with the second end and configured to cool the second radiator; and a thermal management system configured to control the first fan at a first cooling parameter and the second fan at a second cooling parameter, wherein the first cooling parameter is determined based at least in part on an ambient air temperature and a first coolant outlet temperature of the first radiator and the second cooling parameter is determined based at least in part on the ambient air temperature and a second coolant outlet temperature of the second radiator.

B: The vehicle of paragraph A, wherein the first cooling parameter and the second cooling parameter are determined to minimize an energy consumption of the vehicle based at least in part on the first fan or the second fan operating at a speed less than a maximum fan speed, the speed consuming less energy.

C: The vehicle of paragraph A, further comprising: a database comprising a plurality of cooling parameters at which the first fan or the second fan operate, wherein the database is determined based at least in part on at least one of a drag coefficient associated with cooling system of the vehicle.

D: The vehicle of paragraph A, further comprising: an ambient temperature sensor configured to output, to the thermal management system, a first signal, wherein the thermal management system determines the ambient air temperature proximate the vehicle based at least in part on the first signal; a first sensor associated with the first radiator and configured to output, to the thermal management system, a second signal, wherein the thermal management system determines the first coolant outlet temperature based at least in part on the second signal; and a second sensor associated with the second radiator and configured output, to the thermal management system, a third signal, wherein the thermal management system determines the second coolant outlet temperature based at least in part on the third signal.

E: The vehicle of paragraph A, further comprising: a first database comprising a first plurality of cooling parameters at which the first fan operates, and a second database comprising a second plurality of cooling parameters at which the second fan operates.

F: A system comprising: one or more processors; and one or more non-transitory computer-readable media storing computer-executable instructions that, when executed, cause the one or more processors to perform operations comprising: receiving, from a first sensor associated with a vehicle in an environment, first sensor data representing an ambient air temperature; receiving, from a second sensor associated with the vehicle, second sensor data representing a coolant outlet temperature of a radiator of the vehicle; determining, based at least in part on the first sensor data and the second sensor data, a cooling parameter for a fan of the vehicle, the cooling parameter being configured to minimize an energy consumption of the vehicle; and operating the fan at the cooling parameter.

G: The system of paragraph F, wherein the fan is a first fan, the radiator is a first radiator, the coolant outlet temperature is a first coolant outlet temperature, the operations further comprising: receiving, from a third sensor associated with the vehicle, third sensor data representing a second coolant outlet temperature by a second radiator of the vehicle; determining, based at least in part on the first sensor data and the third sensor data, a second cooling parameter for a second fan of the vehicle, wherein the second cooling parameter is different than the cooling parameter; and operating the second fan at the second cooling parameter.

H: The system of paragraph G, wherein: the vehicle is a bi-directional autonomous vehicle, the first fan is proximate a first end of the vehicle, and the second fan is proximate a second end opposite the first end.

I: The system of paragraph F, the operations further comprising: determining a modified cooling parameter based at least in part on: a velocity of the vehicle, a location of the vehicle, a speed limit of a road associated with the environment, or a driving surface.

J: The system of paragraph F, wherein the cooling parameter is a first cooling parameter and the fan is a first fan associated with a first end of the vehicle, wherein the vehicle comprises a second fan operating at a second cooling parameter, the second fan being associated with a second end of the vehicle opposite the first end, and wherein the first cooling parameter is determined based at least in part on accessing a first database and the second cooling parameter is determined based at least in part on at least one of: accessing the first database, or accessing a second database that is different than the first database.

K: The system of paragraph F, wherein the fan is a first fan associated with a first end of the vehicle, and wherein the vehicle comprises a second fan associated with the first end of the vehicle, wherein the first fan operates at a first fan speed and the second fan operates at a second fan speed that is different than the first fan speed.

L: The system of paragraph F, wherein the cooling parameter is determined based at least in part on accessing a database comprising a plurality of cooling parameters at which the fan is to operate at specified ambient temperatures and outlet temperatures.

M: The system of paragraph L, wherein the database is based at least in part on a drag coefficient associated with at least one of a cooling system or a velocity associated with the vehicle.

N: A method comprising: receiving, from a first sensor associated with a vehicle in an environment, first sensor data representing an ambient air temperature; receiving, from a second sensor associated with the vehicle, second sensor data representing a coolant outlet temperature of a radiator of the vehicle; determining, based at least in part on the first sensor data and the second sensor data, a cooling parameter for a fan of the vehicle, the cooling parameter being configured to minimize an energy consumption of the vehicle; and operating the fan at the cooling parameter.

O: The method of paragraph N, wherein the fan is a first fan, the radiator is a first radiator, the coolant outlet temperature is a first coolant outlet temperature, the operations further comprising: receiving, from a third sensor associated with the vehicle, third sensor data representing a second coolant outlet temperature by a second radiator of the vehicle; determining, based at least in part on the first sensor data and the third sensor data, a second cooling parameter for a second fan of the vehicle, wherein the second cooling parameter is different than the cooling parameter; and operating the second fan at the second cooling parameter.

P: The method of paragraph O, wherein: the vehicle is a bi-directional autonomous vehicle, the first fan is proximate a first end of the vehicle, and the second fan is proximate a second end opposite the first end.

Q: The method of paragraph N, further comprising: determining a modified cooling parameter based at least in part on: a velocity of the vehicle, a location of the vehicle, a speed limit of a road associated with the environment, or a driving surface.

R: The method of paragraph N, wherein the cooling parameter is a first cooling parameter and the fan is a first fan associated with a first end of the vehicle, wherein the vehicle comprises a second fan operating at a second cooling parameter, the second fan being associated with a second end of the vehicle opposite the first end, and wherein the first cooling parameter is determined based at least in part on accessing a first database and the second cooling parameter is determined based at least in part on at least one of: accessing the first database, or accessing a second database that is different than the first database.

S: The method of paragraph N, wherein the fan is a first fan associated with a first end of the vehicle, and wherein the vehicle comprises a second fan associated with the first end of the vehicle, wherein the first fan operates at a first fan speed and the second fan operates at a second fan speed that is different than the first fan speed.

T: The method of paragraph N, wherein the cooling parameter is determined based at least in part on accessing a database comprising a plurality of cooling parameters at which the fan is to operate at specified ambient temperatures and outlet temperatures.

U: A vehicle comprising: a fan for cooling a radiator; a thermal management assembly to determine a speed for the fan based at least in part on a drag coefficient associated with the radiator, a velocity of the vehicle, and one or more cooling criteria; and a controller to operate the fan at the speed to cool a portion of the vehicle.

V: The vehicle of paragraph U, wherein the drag coefficient is based at least in part on a direction of travel of the vehicle.

W: The vehicle of paragraph U, wherein the fan is a first fan, the radiator is a first radiator, and the speed is a first fan speed, and further comprising: a second fan for cooling a second radiator, and wherein the drag coefficient includes a first drag value for the first radiator at a first end of the vehicle and a second drag value for the second radiator at a second end of the vehicle, and the thermal management assembly determines a second fan speed for the second fan based at least in part on the first drag value and the second drag value.

X: The vehicle of paragraph W, wherein: the vehicle is a bi-directional autonomous vehicle, the first fan is proximate the first end of the vehicle, and the second fan is proximate the second end opposite the first end.

Y: The vehicle of paragraph A, wherein the one or more cooling criteria comprises one or more of: a coolant temperature associated with the radiator, a compressor operation indicator, a maximum compressor pressure, a passenger compartment temperature, a battery energy threshold, an airflow threshold, or a noise threshold associated with the compressor.

Z: A method comprising: receiving first data indicating airflow through a radiator of an autonomous vehicle; receiving second data indicating power consumption by one or more of: the radiator, a compressor, a pump, or a heating ventilation and air conditioning system; receiving third data representing one or more of: a coolant temperature associated with the radiator, a maximum compressor pressure, a passenger compartment temperature, a battery energy threshold, an airflow threshold, or a noise threshold associated with the compressor; determining, based at least in part on the first data, the second data, and the third data, a speed for a fan proximate the radiator; and operating the fan at the speed to cool an interior portion of the autonomous vehicle.

AA: The method of paragraph Z, wherein the fan is a first fan, the radiator is a first radiator, the airflow value is a first airflow value, and further comprising: receiving fourth data indicating a second airflow value through a second radiator of the autonomous vehicle; determining a speed for a second fan proximate the second radiator based at least in part on the second data, the third data, and the fourth data.

AB: The method of paragraph AA, wherein the autonomous vehicle is bi-directional the first fan is proximate a first end of the vehicle, and the second fan is proximate a second end opposite the first end.

AC: The method of paragraph Z, wherein the first data or the second data is received from one or more sensors associated with the autonomous vehicle.

While the example clauses described above are described with respect to particular implementations, it should be understood that, in the context of this document, the content of the example clauses can be implemented via a method, device, system, a computer-readable medium, and/or another implementation. Additionally, any of examples A-AC may be implemented alone or in combination with any other one or more of the examples A-AC.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A vehicle comprising:
a first radiator associated with a first end of the vehicle;
a first fan associated with the first end and configured to cool the first radiator;
a second radiator associated with a second end of the vehicle, wherein the second end is opposite the first end;
a second fan associated with the second end and configured to cool the second radiator; and
a thermal management system configured to control the first fan at a first cooling parameter and the second fan at a second cooling parameter, wherein the first cooling parameter is determined based at least in part on an ambient air temperature and a first coolant outlet temperature of the first radiator and the second cooling parameter is determined based at least in part on the ambient air temperature and a second coolant outlet temperature of the second radiator.

2. The vehicle of claim 1, wherein the first cooling parameter and the second cooling parameter are determined to minimize an energy consumption of the vehicle based at least in part on the first fan or the second fan operating at a speed less than a maximum fan speed, the speed consuming less energy.

3. The vehicle of claim 1, further comprising:
a database comprising a plurality of cooling parameters at which the first fan or the second fan operate, wherein the database is determined based at least in part on at least one of a drag coefficient associated with cooling system of the vehicle.

4. The vehicle of claim 1, further comprising:

an ambient temperature sensor configured to output, to the thermal management system, a first signal, wherein the thermal management system determines the ambient air temperature proximate the vehicle based at least in part on the first signal;

a first sensor associated with the first radiator and configured to output, to the thermal management system, a second signal, wherein the thermal management system determines the first coolant outlet temperature based at least in part on the second signal; and a second sensor associated with the second radiator and configured output, to the thermal management system, a third signal, wherein the thermal management system determines the second coolant outlet temperature based at least in part on the third signal.

5. The vehicle of claim 1, further comprising:

a first database comprising a first plurality of cooling parameters at which the first fan operates, and a second database comprising a second plurality of cooling parameters at which the second fan operates.

6. A system comprising:

one or more processors; and one or more non-transitory computer-readable media storing computer-executable instructions that, when executed, cause the one or more processors to perform operations comprising:

receiving, from a first sensor associated with a vehicle in an environment, first sensor data representing an ambient air temperature;

receiving, from a second sensor associated with the vehicle, second sensor data representing a coolant outlet temperature of a radiator of the vehicle;

determining, based at least in part on the first sensor data and the second sensor data, a cooling parameter for a fan of the vehicle, the cooling parameter being configured to minimize an energy consumption of the vehicle;

determining a modified cooling parameter based at least in part on:

a velocity of the vehicle, a location of the vehicle, a speed limit of a road associated with the environment, or a driving surface; and operating the fan at the modified cooling parameter.

7. The system of claim 6, wherein the fan is a first fan, the radiator is a first radiator, the coolant outlet temperature is a first coolant outlet temperature, the operations further comprising:

receiving, from a third sensor associated with the vehicle, third sensor data representing a second coolant outlet temperature by a second radiator of the vehicle;

determining, based at least in part on the first sensor data and the third sensor data, a second cooling parameter for a second fan of the vehicle, wherein the second cooling parameter is different than the cooling parameter; and operating the second fan at the second cooling parameter.

8. The system of claim 7, wherein:

the vehicle is a bi-directional autonomous vehicle, the first fan is proximate a first end of the vehicle, and the second fan is proximate a second end opposite the first end.

9. The system of claim 6, wherein the cooling parameter is a first cooling parameter and the fan is a first fan associated with a first end of the vehicle, wherein the vehicle comprises a second fan operating at a second cooling parameter, the second fan being associated with a second end of the vehicle opposite the first end, and wherein the first cooling parameter is determined based at least in part on accessing a first database and the second cooling parameter is determined based at least in part on at least one of:

accessing the first database, or accessing a second database that is different than the first database.

10. The system of claim 6, wherein the fan is a first fan associated with a first end of the vehicle, and wherein the vehicle comprises a second fan associated with the first end of the vehicle, wherein the first fan operates at a first fan speed and the second fan operates at a second fan speed that is different than the first fan speed.

11. The system of claim 6, wherein the cooling parameter is determined based at least in part on accessing a database comprising a plurality of cooling parameters at which the fan is to operate at specified ambient temperatures and outlet temperatures.

12. The system of claim 11, wherein the database is based at least in part on a drag coefficient associated with at least one of a cooling system or a velocity associated with the vehicle.

13. The system of claim 6, wherein the cooling parameter is determined to minimize an energy consumption of the vehicle based at least in part on the fan operating at a speed less than a maximum fan speed, the speed consuming less energy.

14. A method comprising:

receiving, from a first sensor associated with a vehicle in an environment, first sensor data representing an ambient air temperature;

receiving, from a second sensor associated with the vehicle, second sensor data representing a coolant outlet temperature of a radiator of the vehicle;

determining, based at least in part on the first sensor data and the second sensor data, a cooling parameter for a fan of the vehicle, the cooling parameter being configured to minimize an energy consumption of the vehicle, wherein the cooling parameter is determined based at least in part on accessing a database comprising a plurality of cooling parameters at which the fan is to operate at specified ambient temperatures and outlet temperatures; and operating the fan at the cooling parameter.

15. The method of claim 14, wherein the fan is a first fan, the radiator is a first radiator, the coolant outlet temperature is a first coolant outlet temperature, further comprising:

receiving, from a third sensor associated with the vehicle, third sensor data representing a second coolant outlet temperature by a second radiator of the vehicle;

determining, based at least in part on the first sensor data and the third sensor data, a second cooling parameter for a second fan of the vehicle, wherein the second cooling parameter is different than the cooling parameter; and operating the second fan at the second cooling parameter.

16. The method of claim 15, wherein:

the vehicle is a bi-directional autonomous vehicle, the first fan is proximate a first end of the vehicle, and the second fan is proximate a second end opposite the first end.

17. The method of claim 14, further comprising:

determining a modified cooling parameter based at least in part on:

a velocity of the vehicle, a location of the vehicle, a speed limit of a road associated with the environment, or a driving surface.

18. The method of claim 14, wherein the cooling parameter is a first cooling parameter and the fan is a first fan associated with a first end of the vehicle, wherein the vehicle comprises a second fan operating at a second cooling parameter, the second fan being associated with a second end of the vehicle opposite the first end, and wherein the first cooling parameter is determined based at least in part on accessing a first database and the second cooling parameter is determined based at least in part on at least one of:

accessing the first database, or accessing a second database that is different than the first database.

19. The method of claim 14, wherein the fan is a first fan associated with a first end of the vehicle, and wherein the vehicle comprises a second fan associated with the first end of the vehicle, wherein the first fan operates at a first fan speed and the second fan operates at a second fan speed that is different than the first fan speed.

20. The method of claim 14, wherein the database is based at least in part on a drag coefficient associated with at least one of a cooling system or a velocity associated with the vehicle.

\* \* \* \* \*